United States Patent Office 3,283,391
Patented Nov. 8, 1966

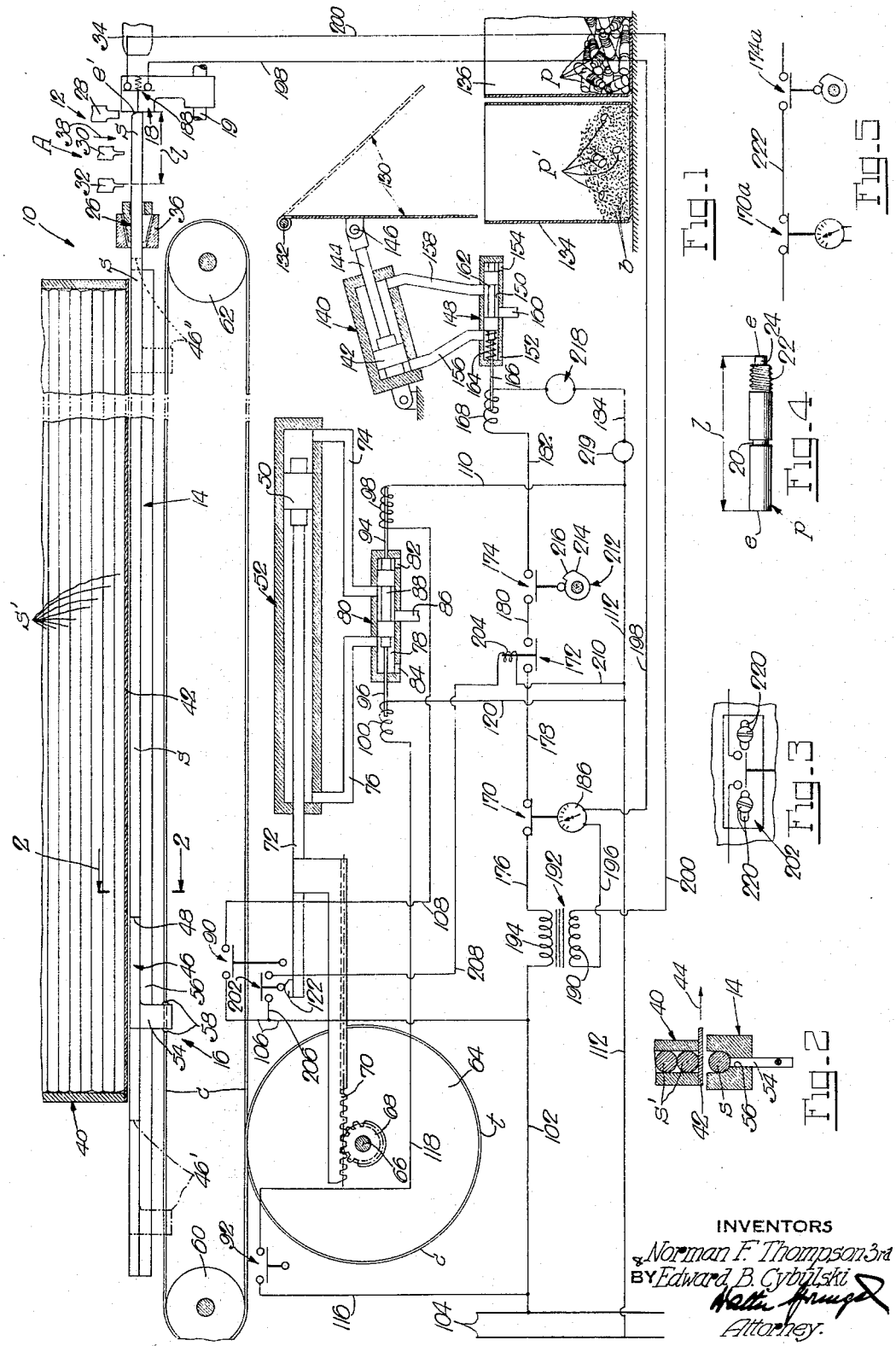

3,283,391
APPARATUS FOR MASS-PRODUCING PRECISION PARTS FROM LONGITUDINAL SUPPLY STOCK
Norman F. Thompson, 3rd, Colebrook, and Edward B. Cybulski, Bristol, Conn., assignors to The Ingraham Company, Bristol, Conn., a corporation of Connecticut
Filed Dec. 7, 1964, Ser. No. 416,538
20 Claims. (Cl. 29—37)

This invention relates in general to machine fabrication of longitudinal stock into mass-production parts, and more particularly to operational controls of such machines for their qualified production of parts of certain precision standards.

The present invention pertains to automatic screw machines, presses and the like, that perform on intermittently fed stock for the formation, including cutoff, of the production parts. While apparatus of this type produce parts of which by far the greater majority are of required precision standards, there will aways be among the produced parts some which are imperfect by being off-standard in one or more important respects. Such imperfect parts are obviously not suited for the intended purpose and, hence, may cause all kinds of difficulties unless they are separated from the other, good parts. However, separation of the imperfect parts from the good parts is a laborious and also costly task which is, moreover, particularly difficult when the parts are of very small size at which imperfections are difficult to detect.

The major imperfections of parts thus produced from stock stem from imperfections of the stock itself. Thus, longitudinal stock used for the purpose is almost invariably of a length at which the very last part therefrom is shorter than all the rest of the parts, and the ends of the stock are usually out-of-square and otherwise deformed to be far from machine-finished, wherefore at least the very first part and the very last part from such stock are almost invariably imperfect by being off-standard in point of required machined finish of both ends and in point of required length, respectively.

It is among the objects of the present invention to provide for parts-producing apparatus of this type an automatic device which rejects and keeps from good parts other parts that are imperfect in either of the aforementioned respects of machined finish of both ends and required length.

It is another object of the present invention to provide for parts-producing apparatus of this type the aforementioned device which automatically rejects the first part produced from new stock and any part of shorter-than-required length, thereby rejecting not only any short last part from the stock and any other part therefrom which is too short owing to conceivable malfunction of the stock feed, but also rejecting all parts without machine-finished ends which can only be the very first part of each new supply stock since the tool cut-off of all other parts from the stock leaves these parts with machine-finished ends.

It is a further object of the present invention to provide for parts-producing apparatus of this type the aforementioned device which functions on cut-off from the supply stock of all good parts to divert the latter into a bin or other parts collector which is out of the path of freely dropping chips or other stock scrap ensuing from the parts formation, but which remains inoperative on cut-off of any imperfect part and, hence, does not interfere with its free gravitational drop, wherefore all rejected imperfect parts never mix with the good parts but, instead, collect with the chips or other stock scrap for their simultaneous disposal therewith.

Another object of the present invention is to provide for parts-producing apparatus of this type the aforementioned device which is not only of exceeding structural simplicity and correspondingly low cost, but lends itself to ready installation in new as well as used parts-producing apparatus.

A further object of the present invention is to provide for parts-producing apparatus of this type the aforementioned device which in its preferred form has a member that is operationally movable for the diversion of all good parts into a parts collector, with the operational movement of this member being caused by a fluid-pressure cylinder under the control of a solenoid valve which may conveniently be actuated by a minimum number of simple switches to bring about operational movement of the member for each good part and to prevent operational movement of the same for each imperfect part.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a diagrammatic illustration of exemplary parts-producing apparatus embodying the present invention;

FIG. 2 is an enlarged fragmentary section through the apparatus along the line 2—2 of FIG. 1;

FIG. 3 is a view of a certain mounted control element of the apparatus;

FIG. 4 is an enlarged view of an exemplary part produced in the apparatus; and

FIG. 5 is a view of part of a modified control circuit of the apparatus.

Referring to the drawings, and more particularly to FIG. 1 thereof, the reference numeral 10 designates parts-producing apparatus which is in the exemplary form of an automatic screw machine having at an operating station A tool means 12 which cyclically perform on longitudinal stock $s$ to grip the same and form and cut-off parts $p$ therefrom (FIG. 4) until the stock is exhausted. The apparatus 10 also includes a guide 14 for the stock $s$ which in this instance is bar stock, and a power-operated stock feed 16, as well as a stop 18 against which the stock is fed intermediate operating cycles of the tool means 12 to gauge the predetermined length of the parts to-be-formed. The stop 18 is in this instance mounted on a shaft 19 for swinging movement into and from alignment with the stock $s$.

The exemplary parts $p$ to be formed in the apparatus have an intermediate peripheral groove 20, a threaded length 22 and a reduced end shank 24 (FIG. 4). To the end of forming these exemplary parts $p$ from the stock $s$, the tool means 12 provide a collet 26, cutting tools 28 to 32 and a die 34, all of which are actuated in timed relation by automatic cam mechanism (not shown) which is conventional in screw machines. Thus, a cyclic performance of the tool means 12 may be as follows. After feed of the stock $s$ through the open collet 26 into engagement with the stop 18 (FIG. 1), the collet will by a sliding actuator 36 be closed into gripping engagement with the stock and then be power-driven to turn the stock, with the stop 18 being swung out of alignment with the stock when the collet is closed. The tools 28 and 30 may next be advanced in the direction of the arrow 38 (FIG. 1) to machine on the gauged part length $l$ of the driven stock the reduced end shank 24 and the peripheral groove 20 (FIG. 4), whereupon these tools are retracted and the die 34 advanced axially over the adjacent end of the stock (FIG. 1) to cut the threaded length 22 (FIG. 4), with the die 34 being next opened for release from the stock and then withdrawn. The tool 32 will next be advanced to cut from the stock $s$ a finished part $p$, and will then be retracted. With the cut-off of the part $p$ from the stock s the part is free for gravitational discharge from the station A. The stop 18 will next be swung again into alignment with the stock and the drive of the collet 26 will stop and the latter be opened. This concludes an operating cycle of the tool means 12, with the stop 18 being in its described swinging motions operated in conventional manner in timed relation with the tool means. As soon as the collet 26 is opened, the stock feed 16 performs to advance the stock against the stop 18 to gauge the correct length of the next part to-be-formed, whereupon the tool means repeat their described cycle performance.

The stock guide 14 is in the simple form of a channel (FIG. 2) which in this instance extends beneath the usual magazine 40 that holds additional supply stock $s'$, with the lower discharge end of the magazine being normally closed by a gate 42 which, on exhaust of the stock in the guide 14, may momentarily be opened in the direction of arrow 44 (FIG. 2) under suitable automatic control for release of the lowermost supply stock $s'$ in the magazine and its gravitational transfer into the guide 14.

The stock feed 16 includes in this instance a feed bar 46 in the stock guide 14 which bears against the trailing end 48 of the stock s and is normally urged toward the operating station A by a cable c which is operated by a piston 50 in a feed cylinder 52. To this end, the feed bar 46 is provided with a lateral tongue 54 which projects through a narrow slot 56 in the stock guide 14 (FIGS. 1 and 2) and is at 58 attached to the cable c so as to be movable therewith. The cable c, which in this instance is endless, is led over spaced guide pulleys 60 and 62 and wound in several turns t around a drum 64 on a shaft 66 which is journalled in suitable fixed bearings (not shown). The cable turns t on the drum 64 are sufficiently tight to have traction on the latter. Also carried by the shaft 66 is a pinion 68 which is in permanent mesh with a rack 70 on the rod 72 of the piston 50 in the feed cylinder 52. The opposite ends of the feed cylinder 52 are through conduits 74 and 76 connected with the chamber 78 of a valve 80 which has vent passages 82 and 84 and is also connected through a conduit 86 with a suitable source of fluid under pressure. Slidable in the valve chamber 78 is a control element 88. Thus, in the one end position of the control element 88 in the valve chamber 78 shown in FIG. 1, the left side of the cylinder 52 is vented via conduit 76 and passage 84 in the valve 80, while the right side of this cylinder is subjected to fluid under pressure via conduit 86, valve 80 and conduit 74, with the result that the piston 50 is urged to the left (FIG. 1). This urgency of the piston 50 is, through the rod 72, rack 70 and pinion 68, transmitted to the drum 64 which will respond thereto in anticlockwise rotation and corresponding drive of the cable c whenever the stock s in the guide 14 encounters no resistance to its forward feed into engagement with the stop 18, i.e., at the times when in the operating cycles of the tool means 12 the collet 26 is opened after cut-off of a finished part p from the stock. It is thus at these times that the piston 50 will, by the fluid under pressure thereagainst in the cylinder 52, be advanced to the left (FIG. 1) in steps to feed the stock each time against the stop 18. In this connection, each feed step of the piston 50 to this end is considerably shorter than each feed step of the stock itself owing to the diameter of the drum 64 which is made considerably larger than the pitch diameter of its coaxial driving pinion 68. Accordingly, the feed cylinder 52 is advantageous considerably shorter than the overall travel of the feed bar 46 for the feed of the stock s until exhausted, with this overall travel of the feed bar 46 being in this example from its rearmost dot-and-dash line position 46′ to its foremost dotted-line position 46″ in FIG. 1. Thus, the feed bar must assume a rearmost position like or similar to its dot-and-dash line position 46′ in order to admit new supply stock from the magazine 40 into the stock guide 14, and the feed bar must advance to a position like or similar to the dotted-line position 46″ which in this instance is just short of the collet 26 so as to leave in the latter, after cut-off of the last part of correct gauge length, a stock remnant which is too short for a part of gauge length and which will be ejected from the collet and freely drop from the station A on the first feed of new stock in the guide 14 into engagement with the stop 18.

The valve 80 for the feed cylinder 52 is solenoid-operated under the control of limit switches 90 and 92. To this end, the control element 88 in the valve 80 has opposite armatures 94 and 96 that cooperate with coils 98 and 100. The coil 98 and associated limit switch 90 are in a circuit which comprises a lead 102 from one side of an A.C. line 104 of commercial voltages, a lead 106, switch 90, a lead 108, coil 98, and leads 110 and 112 to the other side of the line 104. The other coil 100 and its associated limit switch 92 are in a circuit which comprises the lead 102 from one side of the line 104, a lead 116, switch 92, a lead 118, coil 100, and leads 120 and 112 to the other side of the line 104. The rod 72 of the piston 50 of the feed cylinder 52 carries a switch actuator in the exemplary form of a cam 122 which on engagement with either of the normally-open limit switches 90 and 92 closes the same. With the valve 80 being shown in FIG. 1 in position for operational forward feed of the stock s against the stop 18, the piston 50 in the feed cylinder 52 will continue its intermittent feed steps to the left (FIG. 1) until the cam 122 on the piston rod 72 reaches the limit switch 92 at which time the feed bar has reached its exemplary foremost dotted-line position 46″. Engagement of the cam 122 with the switch 92 at that time closes the latter and therewith the described circuit of coil 100, resulting in a shift of the control element 88 in the valve 80 to its other end position, with ensuing admission of fluid under pressure to the left side of the feed cylinder 52 and venting of the right side thereof and, hence, quick return travel of the piston 50 in the cylinder to the right and corresponding quick return travel of the feed bar from its foremost position 46″ toward its rearmost position 46′. The cam 122 will on the return travel of the piston 50 reach the other limit switch 90 just when the feed bar reaches its rearmost position 46′, with the switch 90 being then closed by the cam 122 to thereby close the described circuit of the coil 98, resulting in a return shift of the control element 88 in the valve 80 to the position shown in FIG. 1 and, hence, restoration of the feed cylinder for operational forward feed of new stock which in the meantime has been transferred from the magazine 40 into the stock guide 14. The feed bar 46 will on its ensuing advance from the rearmost position 46′ engage the rear end of the new stock and feed the latter forward until encountering resistance which in the exemplary set-up would be a short remnant of the last stock remaining gripped to the collet 26 in the then occurring operating cycle of the tool means 12. As soon as this cycle of the tool means is completed, i.e., when the collet 26 opens, the stock feed will resume by pushing the new stock through the open collet and against the stop 18, with the new stock thus ejecting the short stock remnant from the collet for its free drop therefrom. FIG. 1 shows stock s in the guide 14 which for the first time has been fed against the stop 18, with the feed bar 46 and the piston 50 in the feed cylinder 52 being shown in corresponding full-line positions in FIG. 1. Accordingly, with the stock s in the guide 14 having just been fed for the first time into engagement with the stop 18, the tool means 12 will next perform their first operating cycle on this stock, and will repeat their cycle performance on the stock after each intermittent stock feed against the stop 18 until the stock is exhausted and replaced with new stock in the described manner, with the cyclic performance of the tool means 12 being continuous on successive stock in the guide 14 while the apparatus is operating.

The exemplary apparatus shown is also equipped with mechanism for largely separating the cut-off parts p from the chips and other stock scrap ensuing from the operation of the tool means on the stock. Thus, there is provided underneath the station A an exemplary chute 130 which is pivotally mounted at 132 for swinging movement into the full-line and dot-and-dash line positions shown in FIG. 1. Thus, the chute 130 is in its full-line position out of the gravitational path of chips from the operating station A into a bin or other collector 134 therebeneath in which such chips b accumulate, and this chute is adapted to be swung into its dot-and-dash line position just before the cut-off of parts p from the stock to intercept the cut-off parts and direct them into a parts bin or collector 136 next to the other bin 134.

In accordance with an important aspect of the present invention, the exemplary chute 130 is further adapted to differentiate in its operation between cut-off parts that meet certain precision standards, i.e., "good" parts, and cut-off parts that fall short of meeting such precision standards, i.e., "bad" parts, by intercepting and diverting good parts into the parts bin 136 and permitting bad parts to drop into the other bin 134.

Most of the precision standards of the exemplary cut-off parts p are under the control and within the close tolerances of the tool means 12 of the apparatus. However, these tool means have no control over certain other precision standards required of good parts, with these other standards being in the present example machine-finish of all parts at both ends e and the same identical gauge length l of all parts (FIG. 4). Thus, while the tool means 12 perform on by far the greater majority of parts so that they meet the requirement of machine-finished ends e owing to the cut-off of the parts from the stock by the cut-off tool 32, the leading unfinished end e' of each new stock (FIG. 1) is out of reach of the cut-off tool 32 and, hence, will not be machine-finished. Accordingly, each first cut-off part from stock does not meet the requirement of being machine-finished at both ends and, hence, is a bad part. Insofar as the other standard requirement of equal gauge length of all parts is concerned, it has already been pointed out that for each piece of stock processed in the apparatus there remains a remnant part which is short of the required gauge length. Moreover, parts of less than required gauge length will occur on malfunction of the stock feed from any cause.

It is, therefore, the purpose to provide for operation of the exemplary chute 130 to discriminate between good and bad parts, and in this example for separating from the parts of machine-finished ends and correct gauge length each part which is cut first from stock, i.e., a "non-finished" part, and each part of less than gauge length, i.e., a "short" part.

The exemplary chute 130 is operated in this instance by a cylinder 140 with a piston 142 the rod 144 of which is at 146 pivotally connected with the chute. The cylinder 140 is under the control of a valve 148 having a chamber 150 which has vent passages 152 and 154 and is connected through conduits 156 and 158 with the opposite ends of the cylinder 140. The valve chamber 150 is further connected through a conduit 160 with a suitable source of fluid under pressure. Slidable in the valve chamber 150 is a control element 162 which by a spring 164 is normally urged into the position shown (FIG. 1) in which the left side of the cylinder 140 is vented via conduit 156 and valve passage 152, and the opposite cylinder side is subjected to fluid under pressure admitted via conduit 160, valve 148 and conduit 158, with the piston 142 thus assuming the position shown for holding the chute 130 in the inoperative full-line position in which the same is out of the gravitational path of any objects from the station A into the bin 134. For shifting the chute 130 into its operative dot-and-dash line position in which to intercept any object from the station A and divert them into the bin 136, the valve 148 is solenoid-operated under the control of several switches. To this end, the control element 162 in the valve has an armature 166 that cooperates with a coil 168 which on energization shifts the control element 162 to its opposite end position in the valve 148 in which to vent the right side of the cylinder 140 and admit fluid under pressure to the left side thereof, with ensuing shift of the piston 142 to the other end of the cylinder and accompanying shift of the chute 130 from its inoperative position into its operative dot-and-dash line position. The control switches for the solenoid-operated valve 148 are indicated at 170, 172 and 174, with these switches being in series in the circuit of the coil 168 to require closing of all of these switches for closure of the circuit. The circuit of the coil 168 comprises the lead 102 from one side of the A.C. line 104, a lead 176, switch 170, a lead 178, switch 172, a lead 180, switch 174, a lead 182, coil 168, and return leads 184 and 112 to the other side of the line 104.

The switch 170, which is normally open, is closed on each engagement of the stock s with the stop 18, and is kept closed substantially for the duration of the next operating cycle of the tool means and at least until after cut-off from the stock of the next part and its deflection into the parts bin 136 by the operative chute 130. The switch 170 is to this end actuated by an electric timer 186 which on momentary energization closes the switch 170 and keeps the same closed for the required time period for which the timer may be set. The timer 186 is controlled in its start by a normally-open switch 188 in its circuit, with this switch 188 being provided in or on the stop 18 so as to be closed by the stock s on each engagement of the latter with the stop 18. The circuit of the timer 186 includes in this instance a power source other than the A.C. line 104 and of lower voltage than the latter, with this power source of lower voltage being in this instance the secondary winding 190 of a transformer 192 the primary winding 194 of which is in the described circuit of the relay 168. Thus, while the A.C. line 104 may carry current of standard 110 v. the output of the secondary 190 of the transformer 192 may be 6 v., for example, to reduce operator hazard at the operating station A due to the presence of the switch 188 thereat, as well as to simplify the wiring by actually using a single conductor and using the apparatus for the return path. The circuit of the timer 186 comprises the secondary winding 190, a lead 196, the timer 186, a lead 198, the switch 188 and a return lead 198, the switch 188 and a return lead 200 to the secondary winding 190. With the switch 172 being normally closed as explained hereinafter, the switch 170, being closed on each engagement of the stock s with the stop 18, is adapted to condition the circuit of the coil 168 for subsequent closure by the switch 174, and hence shift of the chute 130 into its operative dot-and-dash line position, just before cut-off from the stock of any part of proper gauge length, with the switch 174 and the circuit remaining closed at least until the cut-off part has been deflected into the parts bin 136 by the operative chute 130. The switch 172 is normally closed except on the cyclic performance of the tool means 12 on the stock on the very first engagement of the latter with the stop 18 which will result in a bad part because one end thereof is not machine-finished as already explained and, hence, should be permitted to drop into the scrap bin 134. The switch 172 thus responds to a non-finished first part from stock in preventing closure of the circuit of the coil 168 and, hence, a shift of the chute 130 into its operative position.

To the end of having the switch 172 thus respond to a non-finished first part from stock for its drop into the scrap bin 134, there is provided intermediate and in line with the limit switches 90 and 92 a normally-closed switch 202 in a normally closed circuit of a relay 204 which when energized keeps the switch 172 closed. The circuit of the relay 204 comprises the leads 102 and 106 from one side of the A.C. line 104, a lead 206, switch 202, a lead 208, relay 204, a lead 210, and the return lead 112 to the other side of the line 104. The normally-closed switch 202 is opened by the cam 122, as shown in FIG. 1, when the piston 50 in the feed cylinder 52 reaches the end of its first step in feed direction at which new stock in the guide 14 engages for the firt time the stop 18 as shown, with the feed bar 46 being then in its full-line position. With the switch 202 thus opened, the relay 204 will be deenergized and the switch 172 opened, as shown, so that the circuit of the coil 168 will remain open until after cut-off of the first part from the stock and renewed forward feed of the latter toward the stop 18, with the result that the chute 130 will be in its inoperative full-line position when this first part is cut-off and thus permitted to drop into the scrap bin 134 to join other bad parts p' therein. Thus, the switch 172 will be closed except for the formation and cut-off of the very first part from new stock which, being a non-finished part, is thus ejected into the scrap bin 134. With the switch 172 being closed at all other times, the switches 170 and 174 will on each except the first engagement of the stock with the stop 18 act to condition and subsequently close the circuit of the coil 168 for the shift of the chute 130 into its operative position in time to divert each cut-off part of proper gauge length into the parts bin 136. As already mentioned, the switch 170 is closed on each stock engagement with the stop 18 and remains closed substantially during the next operating cycle of the tool means 12, and it is the other switch 174, which belatedly closes the circuit of the coil 168 just before cut-off of a part from the stock, and holds this circuit closed until after this cut-off part have been diverted into the parts bin 136, thereby diverting a minimum of chips or other stock scrap into the parts bin 136. The switch 174 is thus operated by an exemplary cam 212 which is operated in timed relation with the tool means 12, i.e., driven clockwise through one revolution for each operating cycle of the tool means, with the flank 214 of the cam 212 closing the switch 174 just before cut-off of a part from the stock, and the lobe 216 of this cam holding the switch 174 closed at least until this cut-off part has been diverted into the parts bin 136. To adapt the chute 130 to rapidly repeating operating cycles of the tool means with the least diversion of chips into the parts bin 136, opening of the circuit of the coil 168, and hence retraction of the chute 130 into its inoperative full-line position, is preferably achieved by opening of the switch 170 under the control of the timer 186 which may be accurately set, timewise, to open this switch with the least delay after part-diversion into the parts bin 136.

As already mentioned, each part of less than gauge length is also ejected into the scrap bin 134 and, hence, separated from the good parts in bin 136. Thus, unless the switch 188 is closed by stock in engagement with the stop 18, the chute 130 will be in its inoperative position at the part cut-off time in the next operating cycle of the tool means 12 owing to non-closure of the circuit of the coil 168 at the switch 170, as will be readily understood. Hence, any part released at the station A which did not engage the stop 18 will drop into the scrap bin 134 and thus be rejected as a bad part. Such parts are the described short remnants of successive supply stock and also cut-off parts which did not engage the stop 18 owing to malfunction of the stock feed.

Preferably provided in the circuit of the coil 168 is an electric counter 218 to indicate the number of good parts produced. This counter, which may be entirely conventional, is preferably resettable to zero at any time to start counting with each production run of parts. Also provided in the circuit of the coil 168 is a conventional electric programmer 219 which in well-known manner visually records the number of good parts produced over any time period during a production run and such other events which may be significant in recording the overall performance of the apparatus.

The switch 202 is preferably mounted for adjustment longitudinally of the piston rod 72, as by the switch mounting 220 in FIG. 3, for example. In thus providing for adjustability of the switch 202, the same may be accurately positioned for opening by the cam 122 on the first engagement with the stop 18 of stock of different lengths.

FIG. 5 shows part of a modified circuit of the coil 168 (FIG. 1), which is in all respects like the corresponding circuit of FIG. 1, including the switches 170 and 174, but lacking the switch 172, with the switches 170a and 174a in the modified circuit being directly connected by a lead 222. With this modified circuit, the apparatus will pass the first part from stock as a good part and divert it into the parts bin, but will reject all short parts into the scrap bin, as will be readily understood. Performance of the apparatus in this fashion is indicated where machine-finish of the leading end of each part is not a requirement.

The exemplary arrangement of the chute 130 is but one of various forms of a discriminating parts ejector from the operating station within the ambit of the present invention. Further, while the invention is embodied in an exemplary screw machine, the same may obviously be embodied in parts-producing apparatus other than a screw machine, such as a die press for forming and/or blanking parts from strip stock, for example.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In parts-producing apparatus, the combination with tool means at an operating station cyclically performing on longitudinal stock to grip the same and form and cut-off parts therefrom, a stop adapted to be engaged by the stock to gauge the length of each part to-be-formed, and power means outside said station operative intermediate operating cycles of said tool means to feed the stock against said stop, of a device operable to eject a cut-off part from said station in a certain direction; and control means actuated on each except the first engagement of the stock with said stop for operating said device on the next operating cycle of said tool means.

2. In parts-producing apparatus, the combination with tool means at an operating station cyclically performing on longitudinal stock to grip the same and form and cut-off parts therefrom, with the cut-off parts being free for gravitational discharge from said station, a stop adapted to be engaged by the stock to gauge the length of each part to-be-formed, and power means outside said station operative intermediate operating cycles of said tool means to feed the stock against said stop, of a device operable to force a cut-off part into a discharge path other than gravitational; and control means actuated on each except the first engagement of the stock with said stop for operating said device on the next operating cycle of said tool means, whereby any part of less than gauge length and the first part from the stock will on cut-off be separated from the cut-off parts of gauge length.

3. In parts-producing apparatus, the combination with tool means at an operating station cyclically performing on longitudinal stock to grip the same and form and cut-off parts therefrom, with the cut-off parts being free for gravitational discharge from said station, a stop adapted to be engaged by the stock to gauge the length of each part to-be-formed, and power means outside said station operative intermediate operating cycles of said tool means to feed the stock against said stop, of a device including an electric instrumentality operative on energization of the latter to force a cut-off part into a discharge path other than gravitational; a circuit for said instrumentality including normally-open switches for closing said circuit on closure of said switches; and control means actuated on the first engagement only and on each engagement of the stock with said stop to open one of said switches and to close the remaining switches, respectively, on the next operating cycle of said tool means, whereby any part of less than gauge length and the first part from the stock will on cut-off be separated from the cut-off parts of gauge length.

4. In parts-producing apparatus, the combination with tool means at an operating station cyclically performing on longitudinal stock to grip the same and form cut-off parts therefrom, with the cut-off parts being free for gravitational discharge from said station, a stop adapted to be engaged by the stock to gauge the length of each part to-be-formed, and power means outside said station operative intermediate operating cycles of said tool means to feed the stock against said stop, of a device including an electric instrumentality operative on energization of the latter to force a cut-off part into a discharge path other than gravitational; a circuit for said instrumentality including first, second and third normally-open switches in series to close said circuit on closure of said switches; first control means acting to close said first switch for all except the first cycle performances of said tool means on the stock; second control means actuated on each engagement of the stock with said stop to close said second switch for the duration of the next operating cycle of said tool means; and third control means actuated in timed relation with said tool means to close said third switch during a latter part of each operating cycle of said tool means, whereby any part of less than gauge length and the first part from the stock will on cut-off be separated from the cut-off parts of gauge length.

5. The combination in parts-producing apparatus as set forth in claim 4, in which said circuit is a first circuit fed from an A.C. line of commercial voltage, and said second control means include another electric instrumentality acting when energized to close said second switch for the duration of the next operating cycle of said tool means, and another circuit for said other instrumentality including an A.C. source of lower voltage than said line, and a normally open switch at said stop which is closed by the stock on each engagement of the latter with said stop to close said other circuit.

6. The combination in parts-producing apparatus as set forth in claim 5, in which said A.C. source is the secondary winding of a transformer the primary winding of which is in said first circuit.

7. The combination in parts-producing apparatus as set forth in claim 4, in which said circuit further includes an electric counter to indicate the number of parts of gauge length.

8. In parts-producing apparatus, the combination with tool means at an operating station cyclically performing on longitudinal stock to grip the same and form and cut-off parts therefrom, with the cut-off parts being free for gravitational discharge from said station, a stop adapted to be engaged by the stock to gauge the length of each part to-be-formed, and power means outside said station operative intermediate operating cycles of said tool means to feed the stock against said stop, of a device including an electric instrumentality operative on energization of the latter to force a cut-off part into a discharge path other than gravitational; a circuit for said instrumentality including two normally-open switches in series, with said circuit being closed on closure of said switches; control means actuated on each engagement of the stock with said stop for closing one of said switches for the duration of the next operating cycle of said tool means; and other control means actuated in timed relation with said tool means to close the other of said switches during a latter part of each operating cycle of said tool means, whereby any part of less than gauge length will on cut-off from the stock be separated from the cut-off parts of gauge length.

9. In parts-producing apparatus, the combination with tool means at an operating station cyclically performing on longitudinal stock to grip the same and form and cut-off parts therefrom, with the cut-off parts being free for gravitational discharge from said station, a stop operated in timed relation with said tool means to swing into and from alignment with the stock intermediate operating cycles of said tool means and adapted to be engaged by the stock to gauge the length of each part to-be-formed, and power means outside said station operative intermediate operating cycles of said tool means to feed the stock against said stop, of a device including an electric instrumentality operative on energization of the latter to force a cut-off part into a discharge path other than gravitational; a circuit for said instrumentality including two normally-open switches in series, with said circuit being closed on closure of said switches; first control means actuated on each engagement of the stock with said stop for closing one of said switches for the duration of the next operating cycle of said tool means; and second control means actuated in timed relation with said tool means to close the other of said switches during a latter part of each operating cycle of said tool means, whereby any part of less than gauge length will on cut-off from the stock be separated from the cut-off parts of gauge length.

10. The combination in parts-producing apparatus as set forth in claim 9, in which said circuit includes a normally-open third switch, with said circuit being closed on closure of all of said switches, and there is provided third control means acting to close said third switch except for the duration of the first operating cycle of said tool means on the stock, whereby any part of less than gauge length and the first part from the stock will on cut-off be separated from the cut-off parts of gauge length.

11. The combination in parts-producing apparatus as set forth in claim 9, in which said circuit is a first circuit, and said first control means include an electric timer operative on energization to close said one switch for the duration of the next operating cycle of said tool means, another circuit for said timer including a normally open switch at said stop which is closed by the stock on each engagement of the latter with said stop to close said other circuit.

12. The combination in parts-producing apparatus as set forth in claim 11, in which said first circuit is fed from an A.C. line of commercial voltage, and said other circuit includes an A.C. source of lower voltage than said line.

13. The combination in parts-producing apparatus as set forth in claim 9, in which said second control means is a cam driven through one revolution for each operating cycle of said tool means to close said other switch during a latter part of each operating cycle of said tool means.

14. In parts-producing apparatus, the combination with tool means at an operating station cyclically performing on longitudinal stock to grip the same and form and cut-off parts therefrom, with the cut-off parts being free for gravitational discharge from said station, a stop adapted to be engaged by the stock to gauge the length of each part to-be-formed, and means outside said station, including a cylinder and a piston therein with a rod, for feeding the stock to said station, with said piston being intermediate operating cycles of said tool means displaced in progressive steps in said cylinder by fluid pressure therein to feed the stock against said stop, of a device including an electric instrumentality operative on energization of the latter to force a cut-off part into a discharge path other than gravitational; a circuit for said instrumentality including a normally-closed switch member for closing the circuit; and a member on said piston rod opening said switch member between the first and second steps only of said piston in said cylinder in the feed of the stock, whereby the first cut-off part will be separated from all other cut-off parts from the stock.

15. The combination in parts-producing apparatus as set forth in claim 14, in which one of said members is adjustable relative to the other member longitudinally of said rod.

16. In parts-producing apparatus, the combination with tool means at an operating station cyclically performing on longitudinal stock to grip the same and form and cut-off parts therefrom, with the cut-off parts being free for gravitational discharge from said station, a stop adapted to be engaged by the stock to gauge the length of each part to-be-formed, and means outside said station, including a cylinder and a piston therein with a rod, for feeding the stock to said station, with said piston being intermediate operating cycles of said tool means displaced in progressive steps in said cylinder by fluid pressure therein to feed the stock against said stop, of a device including an electric instrumentality operative on energization of the latter to force a cut-off part into a discharge path other than gravitational; a first circuit for said instrumentality including first, second and third normally-open switches for closing said circuit on closure of said switches; first control means acting on each engagement of the stock with said stop to close said first switch for the duration of the next operating cycle of said tool means; second control means operated in timed relation with said tool means to close said second switch during a latter part of each operating cycle of said tool means; a relay adapted when energized to close said third switch; a second circuit for said relay including a normally-closed fourth switch for closing said second circuit; and a member on said piston rod opening said fourth switch between the first and second steps only of said piston in the feed of the stock, whereby any part of less than gauge length and the first part from the stock will on cut-off be separated from the cut-off parts of gauge length.

17. The combination in parts-producing apparatus as set forth in claim 16, in which said fourth switch is adjustable longitudinally of said piston rod.

18. The combination in parts-producing apparatus as set forth in claim 16, in which said stop is operated in timed relation with said tool means to swing into and from alignment with the stock intermediate operating cycles of said tool means, and said first control means include an electric timer operative on energization to close said first switch for the duration of the next operating cycle of said tool means, a third circuit for said timer including a normally-open switch at said stop which is closed by the stock on each engagement of the latter with said stop to close said third circuit.

19. The combination in parts-producing apparatus as set forth in claim 18, in which said timer is adjustable to close said first switch for different durations.

20. The combination in parts-producing apparatus as set forth in claim 18, in which said first and second circuits are fed from an A.C. line of commercial voltage, and said third circuit is fed from an A.C. source of lower voltage than said line.

No references cited.

RICHARD H. EANES, JR., *Primary Examiner.*